United States Patent [19]

Hollen

[11] 4,058,820

[45] Nov. 15, 1977

[54] COINS ORGANIZED IDENTIFICATION NUMBERING SYSTEM APPARATUS AND METHOD

[76] Inventor: Merritt Leroy Hollen, 1712 Notre Dame Ave., Belmont, Calif. 94002

[21] Appl. No.: 700,317

[22] Filed: June 28, 1976

[51] Int. Cl.$^2$ ......................... G07F 3/02; G03B 29/00

[52] U.S. Cl. ......................................... 354/80; 73/163; 194/98; 355/75

[58] Field of Search ..................... 73/163; 354/80, 354; 346/107 R; 194/98; 355/75

[56] References Cited

U.S. PATENT DOCUMENTS

| | | | |
|---|---|---|---|
| 27,140 | 2/1860 | Maranville | 73/163 X |
| 3,964,829 | 6/1976 | Munis | 355/75 |

*Primary Examiner*—L. T. Hix
*Assistant Examiner*—M. L. Gellner
*Attorney, Agent, or Firm*—Flehr, Hohbach, Test, Albritton & Herbert

[57] ABSTRACT

A device for mounting coins for photographic identification and cataloging employs a base mounted rotating table having angular indicia about the edge thereof and an angular reference indicator on the base. A platform for mounting the coin to be photographed is provided which is mounted on a helicoid axial position adjusting device wherein the platform and adjusting device rotate with the table. A disc is provided having a hole therethrough adapted to fit the outer diameter of the coin, for providing coin centering on the platform. A lens holder is provided which is capable of being placed in a position overlying the platform or in a position remote therefrom. A lens is mounted in the lens holder for rotational movement therein, and a pattern of reticle lines if inscribed on the lens. With the table aligned with the base reference, a coin is placed in a north-south position on the platform, retained by the disc and the lens is placed in the position overlying the platform and the coin. The lens is rotated to orient the array of reticle lines in a predetermined angular position relative to the base reference indicator and the table is rotated to a predetermined angular orientation relative to the base reference indicator. A coded photograph of the coin may be taken through the lens producing an identification photo with reticle lines superimposed thereon, and carrying a code indicating the angular orientation of the reticle lines, the table and the style of reticle array utilized.

The method includes orienting a support platform for a coin to be identified relative to an angular reference and thereafter orienting the coin in a predetermined position on the platform. An indentifying reticle display is superimposed on the coin and the reticle display is rotated to a predetermined reticle position. The platform is rotated to a predetermined platform position. A camera is aligned with the angular reference viewing the coin. The coin is photographed and the photograph is identified with indicia signifying reticle display rotation, reticle display identification, and platform rotation so that identifying marks on the coin face are located and recorded for future indentification.

14 Claims, 7 Drawing Figures

COINS ORGANIZED IDENTIFICATION NUMBERING SYSTEM APPARATUS AND METHOD

BACKGROUND OF THE INVENTION

This invention relates to an apparatus and method for obtaining coin identification photographs, and more particularly to an apparatus and method by which such identification photographs can be coded for registration and future identification confirmation.

Coins having numismatic value are imminently transportable and are often stolen and sold through untraceable channels, such that recovery thereafter becomes improbable. Personal identification systems employed by numismatists have limited effectiveness in recovering stolen coins because of the obvious difficulties in disseminating the principles of the system through which the identification is obtained. Consequently, there is a need for a universal method of identifying collected coins and for structure through which such identification may be obtained.

SUMMARY AND OBJECTS OF THE INVENTION

A device is disclosed herein which supports a coin for photographing and which includes a support base and a table mounted for rotational movement on the base. The angular position of the table relative to the support base is indicated by a reference on the base and indicia on the table. The coin is mounted on an appropriate surface carried by the table. A predetermined array of reticle lines is provided which is supported for rotational movement in a holder therefore. The holder is disposed for positioning into and out of a position overlying the mounting for the coin so that a mounted coin photographed through the reticle lines provides a photographic identification record in which the coin is oriented in accordance with the rotational movement of the table and the reticle lines are superimposed thereon in accordance with the rotational movement of the reticle line array.

The method includes orientation of a support platform relative to an angular reference and orientation of the coin in a predetermined position on the platform. An identifying reticle display is superimposed on the coin and the reticle display is rotated to a predetermined reticle position. The platform is also rotated to a predetermined platform position and a camera is oriented relative to the angular reference so that the camera lens views the coin. The coin is photographed and identifying indicia is applied to the photograph signifying the reticle display rotation, the reticle display identification, and the platform rotation, whereby identifying marks on the coin face are located for future reference and identification.

In general, it is an object of the present invention to provide a coin identification method and apparatus which will produce a registrable record of a collectable coin.

Another object of the present invention is to provide an identification method and apparatus which will record a coin's present condition without defacing the coin.

Another object of the present invention is to provide an identification method and apparatus for universal use by numismatists.

Another object of the invention is to provide an identification method and apparatus which will allow a coin of numismatic value to be recovered by it's rightful owner after being stolen.

Another object of the invention is to provide an identification method and apparatus which is easy to understand and simple in structure.

Another objects and features of the invention will appear from the following description in which the preferred embodiment has been set forth in detail in conjunction with the accompanying drawings.

FIGS. **4*a* through 4*c*** are plan views of various reticle displays.

Figure 5:
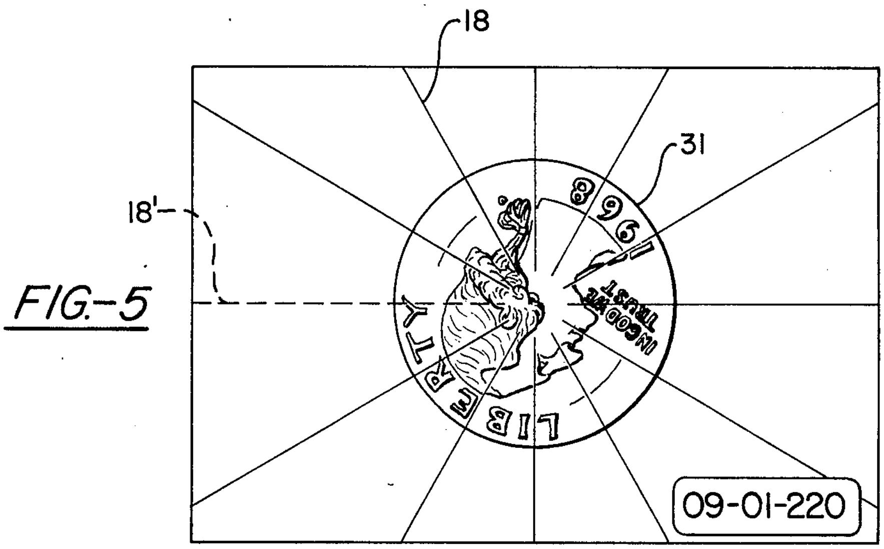

FIG. 5 is a view of an identification photograph obtained through the use of the coin identification apparatus and method.

DESCRIPTION OF THE PREFERRED EMBODIMENT

Figure 1:
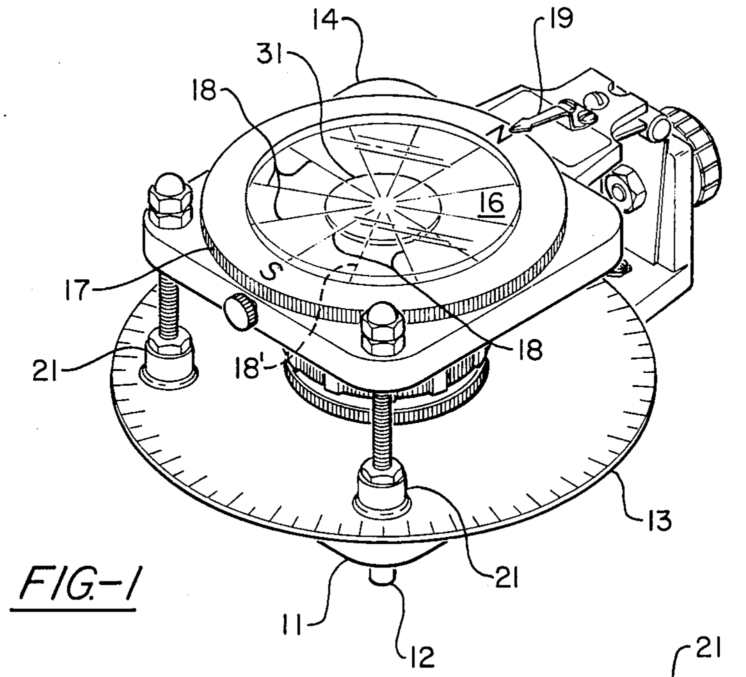
FIG. 1 is an isometric view of the coin identification apparatus.

FIG. 1 shows the apparatus for use in "coin print control" which may be roughly compared to identification of persons through fingerprints. So called bag marks and other aberations on the surface of collectable coins are capable of being utilized for identification of coins having numismatic value. Such marks must be accurately recorded in position on the coin face for positive identification. A photograph is a means for recording the condition of the coin face. Indexing or reticle lines are useful for locating position of the aberations on the coin face. A reticle pattern specific to an individual numismatist together with an orientation coded feature in the identifying photograph is useful for registration and future identification purposes.

FIG. 1 shows a base support 11 having feet 12 thereon, which supports a rotatable table 13. A lens holder 14 is shown having a lens 16 mounted therein for rotational movement relative to lens holder 14 by manually rotating the knurled portion 17 shown surrounding lens 16. Lens 16 has an array of reticle lines 18 disposed thereon. Lens 16 is therefore rotatable relative to an indicator 19 mounted on the stationary part of lens holder 14. Lens holder 14 has adjustable feet 21 attached thereto which are adjustable in vertical position individually to place lens 16 and reticle lines 18 in a predetermined plane. The knurled portion 17 around lens 16 is seen to have a north position identified by N and a south position 180° therefron, identified by S.

Figure 2:
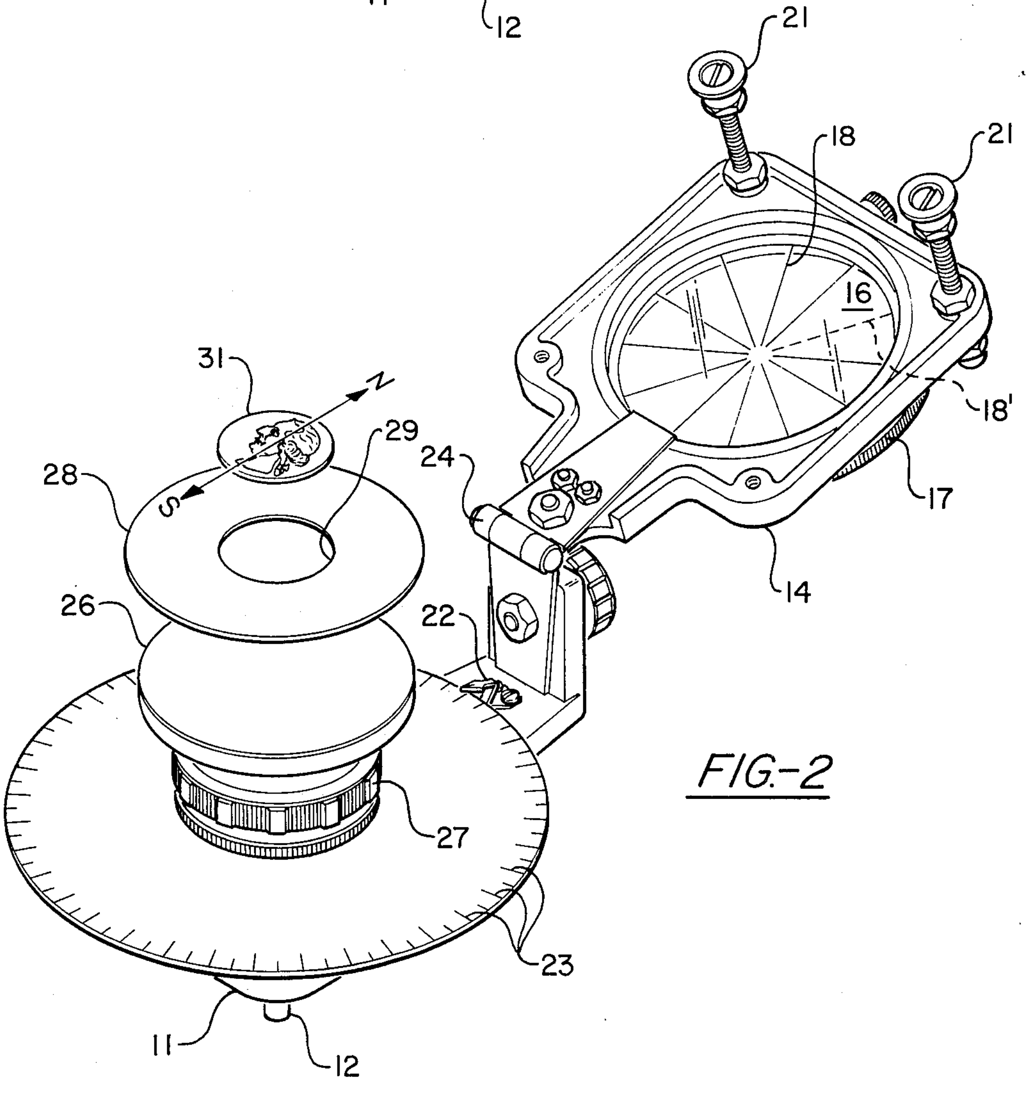
FIG. 2 is an additional isometric view of the coin identification apparatus.

FIG. 2 shows the lens holder 14 and lens 16 disposed in a position away from the position overlying table 13. FIG. 2 shows an indicator 22 or support base 11 associated with indicia 23 on the periphery of rotating table 13. A hinge 24 is provided for attaching lens holder 14 to support base 11 for rotational movement between a position overlying table 13 and an out of the way position as shown in FIG. 2. It is to be understood that the positioning of lens holder 14 between the two extreme positions as shown in FIGS. 1 and 2, may be accomplished by any appropriate equivalent of hinge 24. A platform 26 is shown mounted on a helicoid axial adjustment device 27 which is attached to rotating table 13 and rotates therewith. Manual rotation of the knurled periphery of helicoid axial adjust device 27 provides axial motion of platform 26 relative to rotating table 13. Platform 26, however, rotates with rotating table 13. A disc 28 having a hole 29 therethrough is provided, wherein the outer diameter of disc 28 is indexed on the outside diameter of platform 26. Hole 29 is centrally located in disc 28 and is adapted to contact the periphery of a coin 31 to be mounted on platform 26 for central location of coin 31. Coil 31 may be seen to have what is defined for the purposes of this disclosure as a north-south orientation in FIG. 2, wherein the top of the figure on the face of the coin 31 is oriented in a north direction and the bottom is therefore oriented in a south direction. It should be noted that the array of reticle lines 18 has a dashed line 18' which is used as a reference direction for the reticle array shown in FIGS. 1 and 2.

Figure 3:
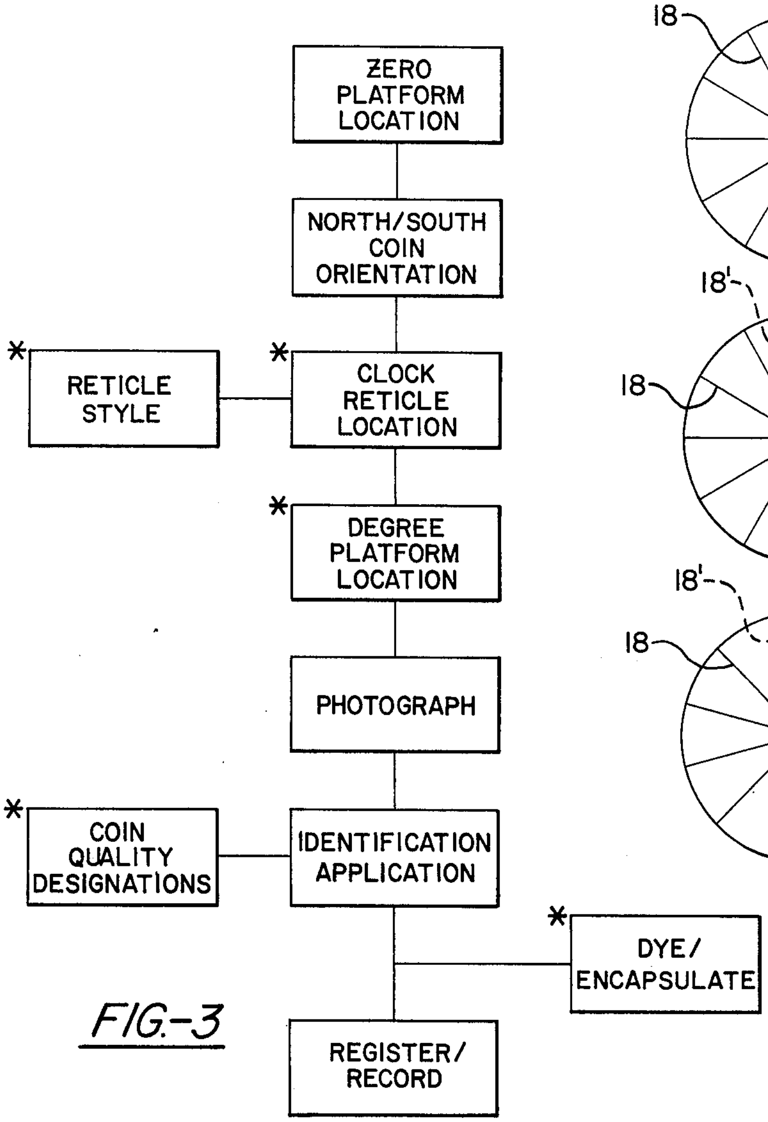
FIG. 3 is a block diagram of the process for obtaining a coin identification.

The manner in which the device of FIGS. 1 and 2 is utilized may best be explained by reference to FIG. 3. With lens holder 14 disposed in the position shown in FIG. 2, away from a position overlying platform 26, and with the appropriate centering disc 28 lying on platform 26, a coin 31 for which the size of hole 29 has been contrived to confine is placed on platform 26 inside hole 29. Coin 31 is oriented in a north-south direction as indicated in FIG. 2. Lens holder 14 is thereafter rotated on hinge 24 to a position overlying platform 26 and coin 31 with feet 21 in contact with the surface of table 13. Feet 21 are thereafter adjusted in vertical position to place the array of reticle lines 18 in a plane substantially parallel with the exposed face of coin 31. Helicoid axial adjust device 27 is rotated to elevate platform 26 to a position where the array of reticle lines 18 are as closely spaced to the exposed surface of coin 31 as possible. The "north-south" position of coin 31 is checked thereafter to affirm that coin 31 is aligned "north-south" relative to indicator 19.

The knurled portion 17 surrounding lens 16 is manually rotated so that the indicator portion, dashed reticle line 18' in FIGS. 1 and 2, of reticle array 18 points to a predetermined clock position wherein north is equivalent to 12:00 in this embodiment. Rotating table 13 is then rotated to a predetermined angular position as indicated by indicator 22 overlying the predetermined angular indicia 23 on the periphery of table 13. With the exposed face of coin 31 closely spaced to the array of reticle lines 18, and with the plane containing the reticle lines 18 adjusted to be parallel to the plane of the exposed face of coin 31, a photograph is taken of the coin through reticle lines 18. The photograph will show the reticle lines superimposed on the face of coin 31, with coin 31 oriented on platform 26 in accordance with the rotation of table 13 and the reticle lines 18 oriented with reticle line 18' rotated in accordance with the rotation of knurled portion 17.

Figure 4A:
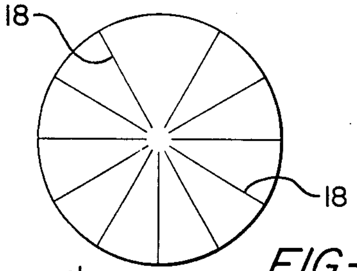
Figure 4B:
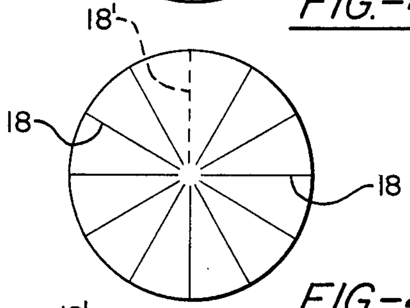
Figure 4C:
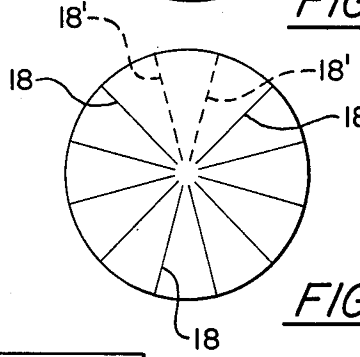

A coin identification is then applied to the obtained photograph which consists of three groups of numerals in its most basic form. The first group of numerals indicates the clockwise rotation of reticle lines 18, specifically reticle line 18', relative to the north or 12:00 position indicated by indicating reference 19. This first number group consists of two integers from 01 to 12, corresponding to 1:00 through 12:00 positions of orientation of the array of reticle lines 18. The second group of numbers is a two integer group designating the reticle style or design. Each individual numismatist is assigned one reticle style, a number of which may be seen in FIG. 4a through 4c. Note that each of the arrays of reticles 18 has associated therewith an index direction. FIG. 4a, for example, is divided into 30° segments with the exception of the uppermost segment which is a 60° segment. Therefore, the center of the uppermost 60° segment in FIG. 4a is the reference direction for that reticle display. FIG. 4b on the other hand, has a dashed line 18' located in the uppermost 60° segment, which is the same type of reticle display shown in FIGS. 1 and 2 of the drawings. FIG. 4c is an alternate design of the reticle display containing two dashed lines 18' on either side of the uppermost 30° segment. The reference direction for the reticle display of FIG. 4c is therefore centrally located in the uppermost 30° segment shown between lines 18' thereon. The reticle array styles are assigned arbitrary designations, and for the purposes of this disclosure may be assigned the two integer designations of 00, 01 and 02 for the styles of FIGS. 4a through 4c respectively.

The third group of numbers in the basic identification applied to the registration photograph is a three integer number. The three number group designates the number of whole degrees from 001 to 360 through which table 13 is rotated from the 0 reference under indicator 22. The indicia 23 are, in this embodiment, therefore in degrees indicating 001 through 360. Consequently, the photograph obtained for identification purposes from the above method employed through the use of the device of FIGS. 1 and 2 is seen by way of example in FIG. 5. Coin 31 is shown having the array of reticle lines 18 superimposed thereon with orientation reticle line 18' pointing to a 9:00 position as shown. Consequently the first two digits of the identification number are 09. The style of the reticle display 18 has been described above as being designated by the digits 01. Consequently the second group of numbers appears as 01. Coin 31 was initially located in a north-south position with indicator 22 overlying the 0° indicia 23 on the periphery of table 13, and table 13 was thereafter rotated until indicia 23 showed 220° thereunder. Coin 31 is shown in the resulting position in the photograph of FIG. 5 and consequently the third three digit number group is shown as 220.

Additional coin identification features may be assigned to the three number group code shown on the photograph of FIG. 5. For example a fourth number group containing four digits therein may be applied following the third number group, wherein the fourth group digits have significance which is capable of authentication by the American Numismatic Association. The first digit in the fourth number group ranges from 1 through 9 having the following significance:

| | |
|---|---|
| 1 | About Good |
| 2 | Good |
| 3 | Very Good |
| 4 | Fine |
| 5 | Very Fine |
| 6 | Extremely Fine |
| 7 | About Uncirculated |
| 8 | Uncirculated |
| 9 | Proof |

The second digit of the four number group is either a 1 or a 2 for plus or minus condition relating to the above-referenced nine condition ratings. The third number in the four number group further amplifies on the plus or minus condition in the second number as follows:

Minus

1. Special
2. Holed or bent
3. Cleaned or Whizzed
4. Edge nicks
5. Scratches
6. Excessive Bag Marks
7. Poor Strike
8. Rub Marks
9. Proof Like Plus 1. Special
2. Reverse better than obverse
3. Obverse better than reverse
4. Sharp Strike
5. Wire Edge
6. Flat Edge
7. Mint Lustre One Side
8. Mirror Finish One Side
9. Brilliant Uncirculated The fourth digit in the four digit group is an indicator of metal composition as follows:

1. Special
2. Clad
3. Aluminum
4. Copper
5. Nickel
6. Silver
7. Gold and Silver
8. Gold
9. Platinum A fifth two digit group may be added to the identification on the photograph of FIG. 5 when particular identification is desired for a particular coin. After coin has been photographed with its coded identification numbering system, it may be encapsulated and registered. A special dye lot is given a number and is used to seal a coin after it has been encapsulated in a plastic holder and sonically sealed. The dye lot number is the fifth two digit group. Thus the coin is protected from any additional marks being made subsequent to the registration photograph which provides for an individual "coin print". In this fashion a coin is provided with a unique "print" which may be registered and thereafter recovered from the registration files for identifying the coin should it even be lost and subsequently turned up in the coin trade as a result of untraceable sales. In this fashion a rightful owner wrongfully deprived of the possession of a valuable coin, and having registered the coin using the apparatus and method disclosed herein, may recover his property.

What is claimed is:

1. Apparatus for use in a coin print control system comprising a lower support frame for contact with an underlying support surface, a table mounted for rotary movement on said lower support frame, said table having angular location indicia disposed thereon, an angular reference position indicator on said lower support frame for alignment with said angular location indicia to thereby obtain a predetermined initial angular orientation of said table relative to said lower support frame, a platform centrally located on said table for movement therewith, a lens holder hinge mounted to said lower support frame for disposition between a position overlying said platform and a position remote therefrom, a lens mounted in said lens holder disposed for rotational movement therein, and a predetermined pattern of reticle lines on said lens, whereby a coin placed centrally on said platform in north-south orientation relative to said predetermined initial angular orientation and photographed through said lens provides a photograph of the coin with said reticle lines superimposed thereon, so that angular reference is provided for identifying marks on the coin for recordation and future identifying reference.

2. Apparatus as in claim 1 wherein said reticle lines are substantially co-planar, together with means for adjusting the spacing between said platform and said lens so that said reticle lines are adjustable to assume a position closely spaced to the plane of the face of the coin, whereby close-up coin photos are made and the reticle lines and coin face are maintained in focus.

3. Apparatus as in claim 1 together with means for centering the coin on said platform, said means for centering avoiding contact with the face of the coin.

4. Apparatus for holding, indexing and displaying a coin for an identification photograph, comprising a base, a table mounted for rotational movement on said base, means for indexing said table relative to a reference orientation with respect to said base, means for mounting the coin centrally attached to said table, a lens, a predetermined reticle pattern on the lens, means for holding the lens for rotational movement therein, said last named means being attached to said base for hinged motion relative thereto into and out of a position overlying said means for mounting the coin, whereby a coin placed on said means for mounting with said lens overlying is photographed to provide an identification photo in which the coin has a predetermined orientation relative to said reference orientation in accordance with said table rotation, and said reticle pattern is superimposed thereon in a predetermined orientation relative to said reference orientation in accordance with said lens rotation.

5. Apparatus as in claim 4 wherein said means for indexing comprises an angular reference indicator on said base and indicia on said table, whereby predetermined indicia aligned with said angular reference indicator provide a predetermined angular rotation of said table relative to said base.

6. Apparatus as in claim 4 together with means for holding the coin centrally located on said table, said last named means avoiding damaging contact with the coin.

7. Apparatus as in claim 4 wherein said means for mounting the coin comprises a platform for supporting the coin, and means for adjusting the spacing between said platform and said lens, whereby said reticle pattern is adjustable to assume a position in close spaced relation with the plane of the coin face, so that the coin face and reticle lines are in focus in magnified photos.

8. Apparatus for supporting a coin to obtain a photographic record thereof comprising a support base, a table mounted for rotational movement on said support base, means for indicating the angular position of said table relative to said support base, means for mounting the coin on said table, means for providing a predetermined array of reticle lines, a holder for supporting said predetermined array of reticle lines for rotational movement therein, said holder being disposed for positioning into and out of a position overlying said means for mounting the coin, whereby a mounted coin photographed through said array of reticle lines provides a photoidentification record with the coin oriented in accordance with the rotational movement of said table, and the reticle lines superimposed thereon in accordance with the rotational movement of said means providing the predetermined array of reticle lines.

9. Apparatus as in claim 8 wherein said array of reticle lines are substantially in a common plane, together with means for adjusting said common plane to be parallel with the median plane of the face of the coin.

10. A method of identifying coins for cataloging, comprising the steps of orienting a support platform relative to an angular reference, orienting the coin in predetermined position on the platform, superimposing an identifying reticle display on the coin, rotating the reticle display to a predetermined reticle position, rotating the platform to a predetermined platform position orienting a camera relative to the angular reference to view the coin, photographing the coin, and identifying the photograph with indicia signifying the reticle display rotation, the reticle display identification, and the platform rotation, whereby identifying marks on the coin face are located and recorded for registration.

11. The method of claim 10 together with the step of adjusting the plane of the reticle display to be closely spaced from the plane of the coin face, whereby the reticle display and coin face are both in focus in the photograph.

12. The method of claim 10 together with the step of adjusting the plane of the reticle display to be parallel to the plane of the coin face, whereby the reticle display is in focus throughout the photograph.

13. The method of claim 10 wherein the step of identifying includes applying indicia signifying coin condition.

14. The method of claim 10 together with the step of encapsulating the coin after photographing and sealing the encapsulation with a dye from a special dye lot, and wherein the step of identifying includes applying indicia signifying the dye lot.

* * * * *